United States Patent
Maruyama

(10) Patent No.: US 11,421,723 B2
(45) Date of Patent: Aug. 23, 2022

(54) SUPPORT STRUCTURE

(71) Applicant: NISSIN KOGYO CO., LTD., Tomi (JP)

(72) Inventor: Yasuhiro Maruyama, Tomi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 16/559,215

(22) Filed: Sep. 3, 2019

(65) Prior Publication Data

US 2020/0080581 A1 Mar. 12, 2020

(30) Foreign Application Priority Data

Sep. 11, 2018 (JP) .............................. JP2018-169397

(51) Int. Cl.
*F16B 17/00* (2006.01)
*F16M 13/02* (2006.01)

(52) U.S. Cl.
CPC ............ *F16B 17/00* (2013.01); *F16M 13/02* (2013.01)

(58) Field of Classification Search
CPC ........... E05D 5/046; E05D 3/02; E05D 7/081; Y10T 16/534; Y10T 403/4648
See application file for complete search history.

(56) References Cited

U.S. PATENT DOCUMENTS

| 2,720,075 | A | * | 10/1955 | Cochran | .................. | D01H 7/16 57/130 |
|---|---|---|---|---|---|---|
| 2,725,221 | A | * | 11/1955 | Werner | .................. | F16K 49/00 261/62 |
| 2,766,079 | A | * | 10/1956 | Browne | .............. | F16C 11/0614 384/209 |
| 3,072,448 | A | * | 1/1963 | James | ..................... | F16C 11/04 384/280 |
| 3,139,898 | A | * | 7/1964 | Wiltgen | ............. | G05D 16/0683 137/454.6 |
| 3,213,724 | A | * | 10/1965 | Mcmurtrie | .............. | B23B 31/02 82/166 |
| 3,560,030 | A | * | 2/1971 | Macks et al. | ............. | F16D 1/09 403/371 |
| 3,610,107 | A | * | 10/1971 | Kawaguchi | ........... | F15B 15/063 92/33 |
| 4,795,926 | A | * | 1/1989 | Someya | ................ | C21C 7/0056 310/90 |

(Continued)

FOREIGN PATENT DOCUMENTS

JP 2589456 1/1999

*Primary Examiner* — Victor D Batson
*Assistant Examiner* — Matthew J Sullivan
(74) *Attorney, Agent, or Firm* — Andrew M. Calderon; Roberts Calderon Safran & Cole, P.C.

(57) ABSTRACT

A support structure including a cylindrical insertion hole. Collars each having a flange formed at one end are press-fitted from both ends of the insertion hole, and fixing means are inserted into the collars. One end of the insertion hole is formed as a small diameter portion, and another end thereof is formed as a large diameter portion. The collars include a small diameter collar of which a press-fit portion has an outer diameter which is press-fitted into an inner diameter of the small diameter portion, and a large diameter collar of which a press-fit portion has an outer diameter which is press-fitted into an inner diameter of the large diameter portion.

19 Claims, 3 Drawing Sheets

(56) References Cited

U.S. PATENT DOCUMENTS

| | | | | |
|---|---|---|---|---|
| 4,809,960 A * | 3/1989 | Kakimoto | ............... | B60G 7/00 |
| | | | | 248/634 |
| 5,093,957 A * | 3/1992 | Do | ..................... | E04C 2/365 |
| | | | | 16/2.1 |
| 7,100,264 B2 * | 9/2006 | Skinner | ................. | B23P 9/025 |
| | | | | 16/2.1 |
| 8,037,578 B2 * | 10/2011 | Megason | ............... | F16C 11/04 |
| | | | | 16/438 |
| 10,359,045 B2 * | 7/2019 | Webster | ................. | F04D 3/00 |
| 10,533,592 B2 * | 1/2020 | Sutcliffe | ............. | F16M 13/022 |
| 10,844,962 B2 * | 11/2020 | Helfer | ................ | F16K 27/0218 |
| 2007/0110541 A1 * | 5/2007 | Rawlins | ................ | F16B 17/00 |
| | | | | 411/54.1 |
| 2016/0341234 A1 * | 11/2016 | Germann | ................ | F16B 5/04 |

\* cited by examiner

SUPPORT STRUCTURE

CROSS-REFERENCE TO RELATED APPLICATION

This application claims priority from Japanese Patent Application No. 2018-169397, filed on Sep. 11, 2018, the entire subject matter of which is incorporated herein by reference.

TECHNICAL FIELD

The present invention relates to a support structure.

BACKGROUND

A support structure is a structure attached to a support member to suspend a body or the like. The support structure is required to have high rigidity and light weight for ensuring the safety of the body or the like.

In the related art, there is known a support structure in which a bolt is inserted into a straight tubular portion and fixed by a nut via collars press-fitted from both ends of an inner periphery of the tubular portion (Patent Literature 1: Japanese Utility Model Registration No. 2589456).

However, in the case of the support structure described in Patent Literature 1, since an outer diameter of the collar on one side and an outer diameter of the collar on another side are the same, the collar on one side may be erroneous assembled by being press-fitted from the other side. In addition, since a hole diameter increases with plastic deformation of the tubular portion at the time of press-fitting the collar on one side, the collar on the other side may come off.

In the present specification, the collars are structural components having a function of restricting positions of fixing means to be inserted and suppressing unnecessary movement. The fixing means are structural components for fixing components of the support member to the support structure. The fixing means are, for example, a bolt and a nut.

SUMMARY

The present invention has been made in view of the above circumstances, and an object thereof is to provide a support structure capable of preventing erroneous assembly of collars and capable of preventing the collars from coming off.

In one embodiment, problems are solved by solutions disclosed below.

A support structure including a cylindrical insertion hole. Collars each having a flange formed at one end are press-fitted from both ends of the insertion hole, and fixing means are inserted into the collars. One end of the insertion hole is formed as a small diameter portion, and another end thereof is formed as a large diameter portion. The collars include a small diameter collar of which a press-fit portion has an outer diameter which is press-fitted into an inner diameter of the small diameter portion, and a large diameter collar of which a press-fit portion has an outer diameter which is press-fitted into an inner diameter of the large diameter portion.

According to the configuration, since the small diameter collar and the large diameter collar are press-fitted into the small diameter portion and the large diameter portion of the insertion hole respectively, the collars can be prevented from being erroneously assembled, and since the plastic deformation of the insertion hole hardly affects press-fitting of the collar on the other side when the collar on one side is press-fitted, the collar can be prevented from coming off.

An axial length of the press-fit portion of the large diameter collar is preferably formed to be shorter than a hole length of the large diameter portion of the insertion hole. According to this configuration, the flange formed in the collar can be press-fitted so as to be in close contact with one end of the insertion hole.

It is preferable that a gap is formed in the axial direction between the small diameter collar and the large diameter collar. According to this configuration, since the small diameter collar and the large diameter collar do not interfere with each other, it is possible to maintain a close contact state between the collars and the insertion hole.

As an example, a main body portion through which the insertion hole is bored is made of aluminum or an aluminum alloy, and the collar is made of iron, steel or alloy steel. Accordingly, the collars are higher in rigidity than the main body portion and can be press-fitted so as to be in close contact with the insertion hole, resulting in a through hole excellent in wear resistance. In addition, the main body portion can achieve weight reduction unique to aluminum or an aluminum alloy.

As an example, the main body portion is formed by casting. Accordingly, a complex shape unique to a casting can be formed. As an example, the collars are formed by forging and then cutting. Accordingly, processing costs are reduced.

According to the disclosed support structure, since one end of the insertion hole is formed in a small diameter and the other end is formed in a large diameter, and the small diameter collar and the large diameter collar are press-fitted into the small diameter and the large diameter respectively, the collars can be prevented from being erroneously assembled, and since the plastic deformation of the insertion hole hardly affects press-fitting of the collar on the other side when the collar on one side is press-fitted, the collar can be prevented from coming off.

DETAILED DESCRIPTION

Figure 1:
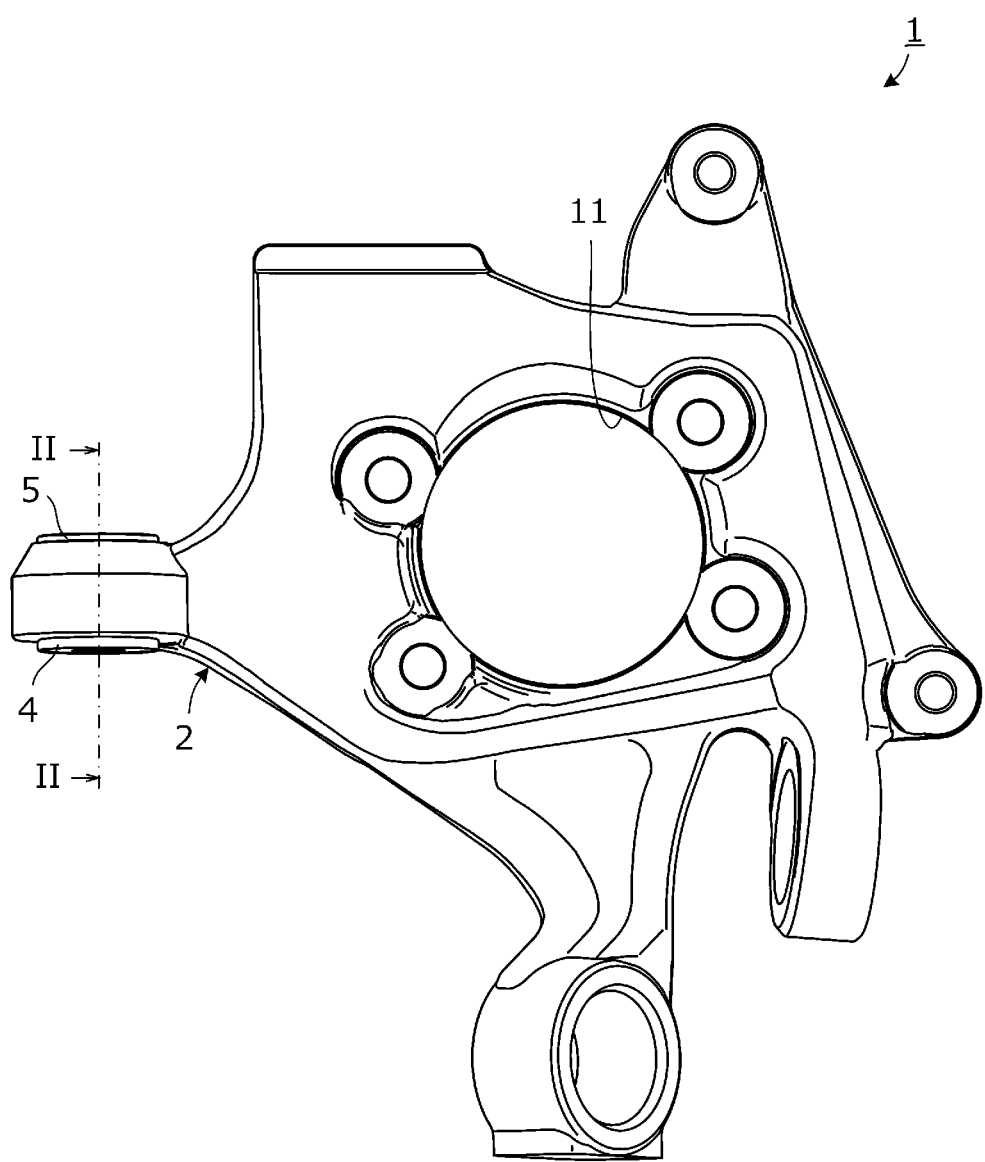
FIG. 1 is a schematic front view showing an example of a support structure according to an embodiment of the present invention.
Figure 2:
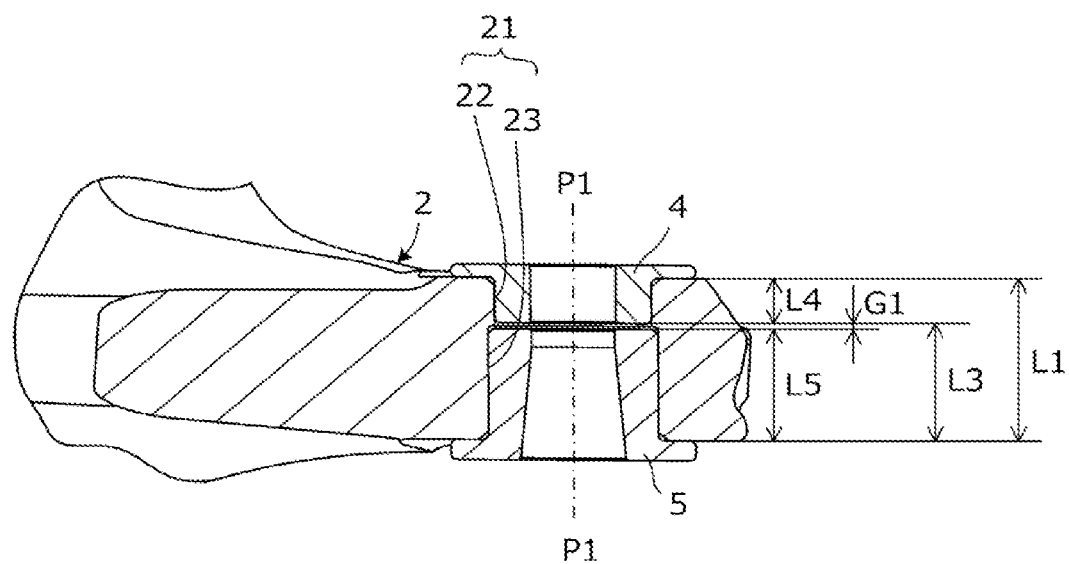
FIG. 2 is a cross-sectional view taken along a line II-II of FIG. 1.

Hereinafter, embodiments of the present invention will be described with reference to the drawings. FIG. 1 is a schematic front view showing an example of a support structure 1 of the present embodiment, and FIG. 2 is a cross-sectional view of an insertion hole 21 and peripheral parts thereof. In all the drawings for describing the embodiments, members having the same functions are denoted by the same reference numerals, and repetitive descriptions thereof will be omitted.

FIG. 1 shows an example in which the support structure 1 is a knuckle for an automobile. The support structure 1 includes a main body portion 2 having a cylindrical insertion hole 21 and attached to a support member, a small diameter collar 4 press-fitted from one end which is formed in a small diameter portion 22 of the insertion hole 21, and a large diameter collar 5 press-fitted from another end which is formed in a large diameter portion 23 of the insertion hole 21. Here, a through hole 11 through which a drive shaft is inserted is formed in a central portion of the main body portion 2.

Figure 3:
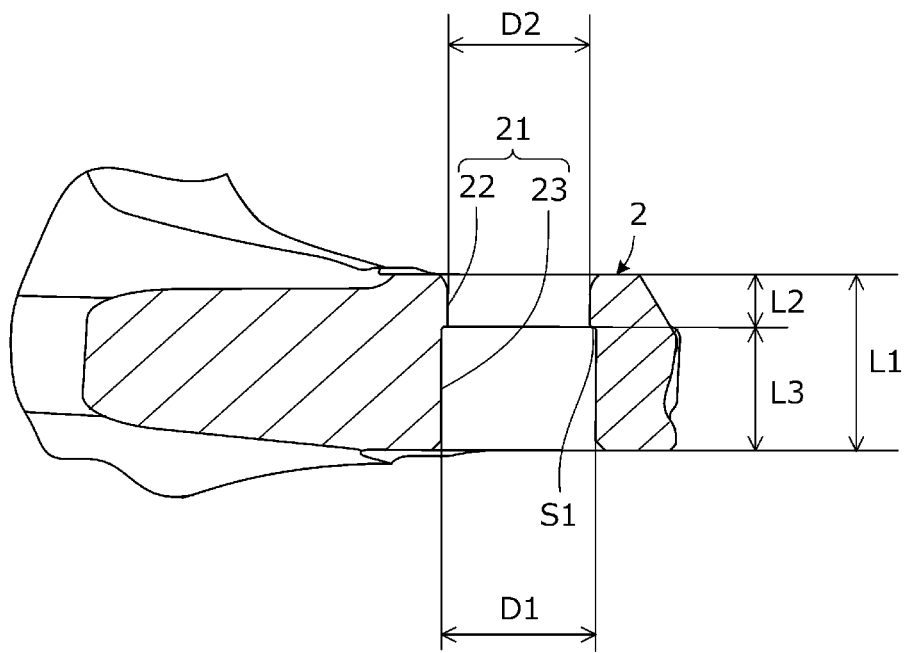
FIG. 3 is a sectional view of a main part of a main body portion according to the present embodiment.

As shown in FIG. 3, in the insertion hole 21 of the main body 2, a straight small diameter portion 22 communicates with a large diameter portion 23 having a diameter larger than that of the small diameter portion 22, and a step S1 is formed at a boundary between the small diameter portion 22 and the large diameter portion 23.

Figure 4A:
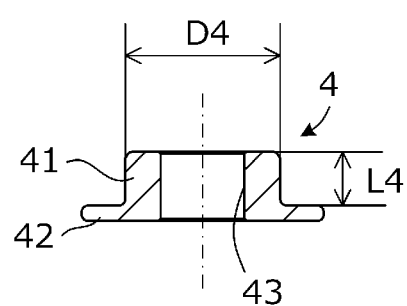
FIG. 4A is a cross-sectional view of a small diameter collar according to the present embodiment.

As shown in FIG. 4A, the small diameter collar 4 includes a press-fit portion 41 having an outer diameter D4 with the same diameter as an inner diameter D2 of the small diameter portion 22, and a flange 42 formed at one end of the press-fit portion 41, and a straight through hole 43 is formed in an axial direction.

Figure 4B:
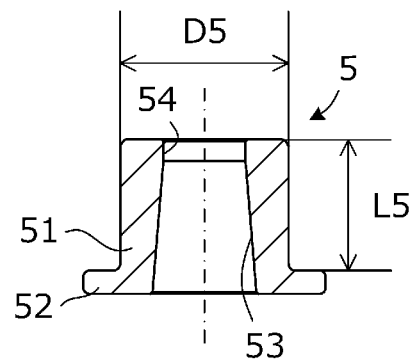
FIG. 4B is a cross-sectional view of a large diameter collar according to the present embodiment.

As shown in FIG. 4B, the large diameter collar 5 includes a press-fit portion 51 having an outer diameter D5 with the same diameter as an inner diameter D1 of the large diameter portion 23, and a flange 52 formed at one end of the press-fit portion 51. A through hole having a predetermined shape is formed in the large diameter collar 5 in the axial direction, and the through hole is formed by communicating a tapered hole 53 extending from a flange 52 side to an opposite side with a straight hole 54 extending from the opposite side of the flange 52 to the flange 52 side. Accordingly, a bolt can be easily inserted into the large diameter collar 5, and a tip end position of the bolt can be easily aligned with an axis line. In addition, a surface pressure from the inserted bolt to the large diameter collar 5 is relieved.

According to the present embodiment, since the small diameter collar 4 and the large diameter collar 5 are press-fitted into the small diameter portion 22 and the large diameter portion 23 of the insertion hole 21 respectively, the collars can be prevented from being erroneously assembled, and since the plastic deformation of the insertion hole hardly affects press-fitting of the collar on the other side when the collar on one side is press-fitted, the collar can be prevented from coming off.

In the present embodiment, an axial length L5 of the press-fit portion 51 of the large diameter collar 5 is shorter than an axial length L3 of the large diameter portion 23 of the insertion hole 21. According to this configuration, the flange 52 formed in the large diameter collar 5 can be press-fitted so as to be in close contact with the other end of the insertion hole 21.

In the present embodiment, an axial length L4 of the press-fit portion 41 of the small diameter collar 4 is the same as or shorter than an axial length L2 of the small diameter portion 22 of the insertion hole 21. According to this configuration, the flange 42 formed in the small diameter collar 4 can be press-fitted so as to be in close contact with one end of the insertion hole 21.

As shown in FIG. 2, a gap G1 is formed in the axial direction (P1-P1 line direction) between the small diameter collar 4 and the large diameter collar 5. According to this configuration, since the small diameter collar 4 and the large diameter collar 5 do not interfere with each other, it is possible to maintain a close contact state between the main body portion 2 and the flange 42 and between the main body portion 2 and the flange 52.

If the sum of the axial length L4 of the press-fit portion 41 and the axial length L5 of the press-fit portion 51 is shorter than the axial length L1 of the insertion hole 21, the axial length L4 of the press-fit portion 41 of the small diameter collar 4 may be formed to be longer than the axial length L2 of the small diameter portion 22 of the insertion hole 21.

EMBODIMENT

A steering knuckle is produced as the support structure 1 by casting an aluminum alloy. After forging of iron, steel or alloy steel, cutting is performed to produce the small diameter collar 4 and the large diameter collar 5. The large diameter collar 5 is press-fitted into the large diameter portion 23 of the insertion hole 21, and the small diameter collar 4 is press-fitted into the small diameter portion 22 of the insertion hole 21. As a result, the small diameter collar 4 and the large diameter collar 5 are in close contact with the main body portion 2 to maintain the close contact state. Since the step S1 is formed at the boundary between the small diameter portion 22 and the large diameter portion 23, the plastic deformation of the insertion hole 21 at the time of press-fitting the large diameter collar 5 does not affect the press-fitting of the small diameter collar 4, and there is no risk of erroneous assembly.

The bolt is inserted from a large diameter collar 5 side, and the nut is disposed on a small diameter collar 4 side, and the bolt and the nut are used as fixing means. The large diameter collar 5 has a function of reducing a surface pressure of the bolt, and the small diameter collar 4 has an auxiliary function of fastening the nut.

The present invention is not limited to the embodiment described above, and various modifications can be made without departing from the present invention.

What is claimed is:
1. A support structure comprising:
a cylindrical insertion hole,
wherein collars each having a flange formed at one end are press-fitted from both ends of the insertion hole, and fixing means are inserted into the collars,
wherein one end of the insertion hole is formed as a small diameter portion, and another end thereof is formed as a large diameter portion, the small diameter portion communicates with the large diameter portion having a diameter larger than that of the small diameter portion, and a step is formed at a boundary between the small diameter portion and the large diameter portion, and
wherein the collars comprise a press fit connection including a small diameter collar of which a press-fit portion has an outer diameter which is press-fitted into and contacts an inner diameter of the small diameter portion, and a large diameter collar of which a press-fit portion has an outer diameter which is press-fitted into and contacts an inner diameter of the large diameter portion.
2. The support structure according to claim 1,
wherein an axial length of the press-fit portion of the large diameter collar is formed to be shorter than an axial length of the large diameter portion of the insertion hole.
3. The support structure according to claim 1,
wherein a main body portion through which the insertion hole comprises aluminum or an aluminum alloy.
4. The support structure according to claim 1,
wherein the collars are made of iron, steel or alloy steel.
5. The support structure according to claim 3,
wherein the collars are made of iron, steel or alloy steel.

6. The support structure according to claim 2,
wherein a main body portion through which the insertion hole comprises aluminum or an aluminum alloy.

7. The support structure according to claim 2,
wherein the collars are made of iron, steel or alloy steel.

8. The support structure according to claim 1,
wherein the flange of the large diameter collar has a diameter that is larger than the inner diameter of the large diameter portion of the insertion hole.

9. The support structure according to claim 8,
wherein the flange of the large diameter collar contacts a surface of the support structure outside of the large diameter portion of the insertion hole.

10. A support structure comprising:
a cylindrical insertion hole,
wherein collars each having a flange formed at one end are press-fitted from both ends of the insertion hole, and fixing means are inserted into the collars,
wherein one end of the insertion hole is formed as a small diameter portion, and another end thereof is formed as a large diameter portion, and
wherein the collars include a small diameter collar of which a press-fit portion has an outer diameter which is press-fitted into and contacts an inner diameter of the small diameter portion, and a large diameter collar of which a press-fit portion has an outer diameter which is press-fitted into and contacts an inner diameter of the large diameter portion, and
wherein a through hole is formed in the large diameter collar in an axial direction, the through hole includes a tapered hole extending from a flange side to an opposite side with a straight hole extending from the opposite side of the tapered hole.

11. The support structure according to claim 1,
wherein an axial length of the press-fit portion of the large diameter collar is shorter than an axial length of the large diameter portion of the insertion hole.

12. The support structure according to claim 1,
wherein an axial length of the press-fit portion of the small diameter collar is the same as or shorter than an axial length of the small diameter portion of the insertion hole.

13. The support structure according to claim 1,
wherein a gap is formed in an axial direction between the small diameter collar and the large diameter collar.

14. The support structure according to claim 1,
wherein the small diameter collar and the large diameter collar do not interfere with each other.

15. The support structure according to claim 1,
wherein a sum of an axial length of the press-fit portion of the smaller diameter collar and an axial length of the press-fit portion of the large diameter collar is shorter than an axial length of the insertion hole.

16. The support structure according to claim 1,
wherein an axial length of the press-fit portion of the small diameter collar is shorter than an axial length of the press-fit portion of the large diameter collar.

17. The support structure of claim 1,
wherein a sum of an axial length of the first collar located within the insertion hole and the second collar located within the insertion hole is less than an axial length of the cylindrical insertion hole.

18. The support structure according to claim 1, wherein the large diameter collar includes a tapered through hole.

19. The support structure according to claim 18, wherein the tapered through hole includes a larger diameter at the flange than at an opposing end thereof.

* * * * *